United States Patent [19]
Chernyakov et al.

[11] Patent Number: 6,032,484
[45] Date of Patent: *Mar. 7, 2000

[54] RECOVERY OF PERFLUORINATED COMPOUNDS FROM THE EXHAUST OF SEMICONDUCTOR FABS WITH RECYCLE OF VACUUM PUMP DILUENT

[75] Inventors: Iosif Chernyakov, Fort Lee, N.J.; Thomas Hsiao-Ling Hsiung, Emmaus, Pa.; Alexander Schwarz, Bethlehem, Pa.; James Hsu-Kuang Yang, Allentown, Pa.

[73] Assignee: Air Products and Chemicals, Inc., Allentown, Pa.

[ * ] Notice: This patent is subject to a terminal disclaimer.

[21] Appl. No.: 09/046,083

[22] Filed: Mar. 23, 1998

[51] Int. Cl.$^7$ ................ F25J 3/00; B01D 53/22
[52] U.S. Cl. .................................. 62/624; 95/48
[58] Field of Search ............... 62/624, 642, 644, 62/655; 95/45, 47, 53, 90, 149, 288, 48

[56] References Cited

U.S. PATENT DOCUMENTS

| | | |
|---|---|---|
| Re. 33,678 | 9/1991 | Campbell et al. . |
| 4,119,417 | 10/1978 | Heki et al. . |
| 4,180,388 | 12/1979 | Graham et al. . |
| 4,435,191 | 3/1984 | Graham . |
| 4,597,777 | 7/1986 | Graham . |
| 4,599,096 | 7/1986 | Burr .......................... 95/51 |

(List continued on next page.)

FOREIGN PATENT DOCUMENTS

| | | |
|---|---|---|
| 0754487A1 | 1/1997 | European Pat. Off. . |
| 754487 | 1/1997 | European Pat. Off. . |

OTHER PUBLICATIONS

Glenn M. Tom, et al., "PFC Concentration and Recycle" Mat. Res. Soc. Symp. Proc. vol. 344, 1994 pp. 267–271.
Denis Ruffin presentation at semiconductor PFC workshop in Austin Texas, Feb. 7, 1996.
Air Products and Chemicals, Inc. and Radian International L.L.C., PFC Recovery Systems for the Electronics Industry, 1996, Publication No. 325–95410.
Rautenbach, et al., Gas Permeation–Module Design and Arrangement, Chem. Eng. Process, 21 (1987) pp. 141–150.
"PFC Capture Alpha Systems Testing Update", Ruffin, et al., *PFC Technical Update* SEMI 1996.
"PFC Capture Alpha Systems Testing Update", Cummins, et al., SEMI 1996.

*Primary Examiner*—William Doerrler
*Attorney, Agent, or Firm*—Geoffrey L. Chase

[57] ABSTRACT

A method for the separation and recovery of fluorochemicals from a gas stream containing a diluent gas and fluorochemicals by first contacting the gas stream with a membrane system in one or more stages where the membrane(s) is selectively more permeable to the diluent gas than the fluorochemicals to result in a permeate stream rich in diluent gas and retentate rich in fluorochemicals, thereafter subjecting retentate the gas stream to a purification by distillation or adsorption resulting in a product stream enriched in fluorochemicals and a purified diluent stream. The purified diluent stream is used as a purge stream and/or a recycle stream together with the permeate stream to a vacuum pump upstream of the membrane separation step.

A product stream can be produced from a similar gas stream containing diluent gas and fluorochemical by an adsorption step combined with a subsequent distillation step where the purified diluent from the adsorption step is used as a purge stream and/or wholly or partial combined with a purified diluent stream from the distillation step as a recycle stream introduced into the process upstream of the adsorption step.

Enriched fluorochemical and an enriched diluent streams can be produced from a stream containing diluent gas and fluorochemicals by cryogenic distillation with the enriched diluent stream recycled to the process upstream of the distillation step.

7 Claims, 1 Drawing Sheet

U.S. PATENT DOCUMENTS

| | | |
|---|---|---|
| 4,654,063 | 3/1987 | Auvil et al. . |
| 4,701,187 | 10/1987 | Choe et al. . |
| 4,781,907 | 11/1988 | McNeill . |
| 4,787,919 | 11/1988 | Campbell et al. . |
| 4,894,068 | 1/1990 | Rice . |
| 4,964,886 | 10/1990 | Brugerolle et al. . |
| 5,051,114 | 9/1991 | Nemser et al. . |
| 5,064,446 | 11/1991 | Kusuki et al. . |
| 5,240,471 | 8/1993 | Barbe et al. . |
| 5,252,219 | 10/1993 | Xu . |
| 5,282,969 | 2/1994 | Xu . |
| 5,378,263 | 1/1995 | Prasad . |
| 5,417,742 | 5/1995 | Tamhankar et al. . |
| 5,455,016 | 10/1995 | Choe et al. . |
| 5,482,539 | 1/1996 | Callahan . |
| 5,502,969 | 4/1996 | Jin et al. . |
| 5,730,779 | 3/1998 | Chernyakov et al. ................ 95/45 |

RECOVERY OF PERFLUORINATED COMPOUNDS FROM THE EXHAUST OF SEMICONDUCTOR FABS WITH RECYCLE OF VACUUM PUMP DILUENT

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The semiconductor industry uses fluorinated gases, such as carbon tetrafluoride and hexafluoroethane, as etchants and cleaning gases in semiconductor manufacturing processes. These gases do not fully react within the reaction chamber. The unused gases enter the atmosphere through the process effluent from such reactors and have long persistence in the atmosphere and absorb infrared radiation. These gases absorb infrared radiation and are, therefore, potential global warming gases. The industry has sought ways to diminish the amount of fluorinated gases reaching the atmosphere and ways to recycle such gases particularly in light of their low utilization on a single pass basis for their intended etching and cleaning purposes.

Fluorochemicals, such as perfluorinated hydrocarbons and perfluorinated chemicals, are used in the semiconductor industry as safe and noncorrosive sources of fluorine. In plasma environments, fluorochemicals, such as fluorinated gases, form fluorine species which are capable of etching wafers or cleaning insides of reactor chambers. The gaseous products of the etching or cleaning process are exhausted from the reactor chamber to the scrubber or vent systems of the semiconductor fabrication plant with potential for venting to atmosphere. Consumption of fluorinated gases in the reaction chamber products is not complete. Experiments have shown that in some cases less than 10% of hexafluoroethane is used.

Abatement of fluorochemicals currently follows several techniques. One method currently used by the semiconductor industry for insuring that fluorochemicals are not released to the environment involves combustion of the fluorochemicals contained in an effluent stream. While this method effectively destroys the fluorochemicals, thus preventing environmental pollution, it also makes it impossible to reuse the fluorochemicals. This method is also disadvantageous because it generates waste gases, such as hydrogen fluoride and nitrogen oxides, which require further treatment. Furthermore, combustion processes require fuel and oxygen to operate, adding additional operating and capital cost to the semiconductor and manufacturing operation.

Alternatively, these fluorochemicals can be recovered for reuse. Several schemes have been published in the literature to capture these chemicals.

Glenn M. Tom, et al. in the article "*PFC Concentration and Recycle*", Mat. Res. Soc. Symp. Proc. Vol. 344, 1994, pp 267–272 describes a process for concentrating perfluorinated gases using carbon-containing adsorptive beds. This process requires considerable energy demands based upon pressurization and depressurization to maintain a continuous process in switching adsorptive beds.

U.S. Pat. No. 5,502,969 discloses a process using a mass transfer contact zone with a wash liquid and one or more stages of cryogenic distillation to recover fluorine compounds from a carrier gas such as those constituting an effluent stream from a semiconductor facility. Both cryogenics and adsorption comprise energy-intensive and capital-intensive separatory processes.

Denis Rufin in a presentation at a semiconductor PFC workshop in Austin, Tex., Feb. 7, 1996, presented a process for recycling perfluorochemicals from a process tool exhaust. The process involves compression, wet and dry scrubbing, additional compression, filtration, a concentration step followed by condensation and packaging for recycle after offsite purification, certification and additional repackaging. The perfluorocarbon concentration unit disclosed in the process sequence was not identified. Rufin made a similar presentation at Semicon West, *PFC CAPTURE ALPHA SYSTEMS TESTING UPDATE*, 1996, pp 49–54.

U.S. Pat. No. 4,119,417 discloses a process wherein a feed gas stream is passed over two cascade connected semi-permeable membranes with the permeate stream from the second membrane being recycled to the feed gas prior to the first membrane. The process is typified by a separation of nitrogen from krypton. Other gases which can be separated from various binary mixtures include hydrogen, helium, nitrogen, oxygen, air, neon, argon, krypton, xenon, radon, fluorine, chlorine, bromine, uranium hexafluoride, ozone, hydrocarbons, sulfur dioxide, vinyl chloride, acrylonitrile and nitrogen oxides. The membranes utilized for these separations include silicon rubber, polybutadiene rubber, polyethylene, tetramethyl pentane resin, cellulose acetate, ethyl cellulose, Nuclear Pore, a material produced by General Electric, tetrafluoroethylene, polyester and porous metal membranes.

U.S. Pat. No. 4,654,063 discloses a process for conducting hydrogen purification using a semi-permeable membrane along with a non-membrane type separation wherein the retentate from the membrane can be further processed in a cryogenic or adsorptive separation system.

U.S. Pat. No. 4,701,187 discloses the use of cascade membranes wherein the retentate from a first membrane is conducted to a second membrane and the retentate from the second membrane is conducted to a down stream further adsorptive separation for product recovery. The permeate from the second membrane is recycled to the feed of the first membrane.

Air Products and Chemicals, Inc. and Radian International L.L.C. publicized a process titled *PFC Recovery Systems for the Electronics Industry*, 1996, Publication No. 325-95410 depicting a process wherein a mixture of vacuum pump diluent and fluorinated gases from a process tool of a semiconductor fabrication facility passes through a guard bed and a wet scrubber followed by gas compression, drying and adsorption with recycle of a portion of the purified diluent from the adsorbers to before the gas compression, while the more concentrated fluorinated gases pass through further gas compression, condensation and distillation to recover a product, such as 99.9+% hexafluoroethane. The process can be designed to recover hexafluoroethane, carbon tetrafluoride, trifluoromethane, nitrogen trifluoride and sulfur hexafluoride.

Rautenbach, et al., Gas Permeation-Module Design and Arrangement, Chem. Eng. Process, 21, 1987, pp. 141–150 discloses various membrane arrangements for gas separation.

European Patent Application published as EP 0 754 487 A1 discloses a process for recovery perfluorinated compound from a gas mixture using a combination of membranes and distillation to recover the perfluorinated components. The permeate stream from the membrane unit(s) is recycled as feed to the membrane unit. There is no disclosure relating to using the permeate stream as a vacuum pump diluent.

Additional patents of interest include U.S. Pat. Nos. 4,180,388, 4,894,068, 5,240,471 and 5,252,219.

The prior art, although addressing the problem of capture and recycle of fluorochemicals used in the semiconductor industry, such as perfluorinated compounds and more specifically perfluorocarbons, has failed to provide a low capital cost, low energy-intensive process for the capture and concentration of the desired fluorinated compounds as is achieved by the present invention, which will be set forth in greater detail below.

BRIEF SUMMARY OF THE INVENTION

The present invention is a process for the separation and recovery of fluorochemicals from a gas stream containing a diluent gas and fluorochemicals by contact of the gas stream with a membrane, comprising the steps of:

(a) compressing a gas stream containing a diluent gas and fluorochemicals to an elevated pressure;

(b) heating the gas stream containing a diluent gas and fluorochemicals to an elevated temperature sufficient to increase the flux of the permeate stream of step (c) and to increase the selectivity of the membrane of step (c) for the permeation of the diluent gas of step (c) relative to the permeation of the fluorochemicals of step (c);

(c) contacting the gas stream with a membrane system containing one or more stages to produce a permeate stream rich in the diluent gas and a retentate rich in fluorochemicals;

(d) purifying the retentate by a process selected from the group consisting of distillation and adsorption to produce a product stream richer in fluorochemical and a recycle stream rich in diluent gas (e) recycling the permeate stream and the recycle stream to the vacuum pump as the diluent gas which is combined with the gas stream containing diluent gas and fluorochemicals, the combined stream, after scrubbing, being the stream supplied to step (a) to be compressed to an elevated pressure.

The invention also includes an optional step wherein the gas stream containing a diluent gas and fluorochemicals is initially scrubbed to remove particulates, acid gases and other water soluble components of the gas stream.

The process of the invention is advantageously applied to a gas stream containing a diluent gas and fluorochemicals selected from the group consisting of $NF_3$, $SF_6$, $CF_4$, $CHF_3$, $CH_3F$, $C_2F_6$, $C_2HF_5$, $C_3F_8$, $C_4F_8$ and mixtures thereof Preferably the gas stream containing a diluent gas and fluorochemicals is an effluent gas stream from a semiconductor fabrication process.

According to one aspect of the invention the membranes are selected from the group consisting of polysulfone, polyetherimide, polypropylene, cellulose acetate, polymethylpentane, amorphous copolymers based on 2,2-bistrifluoromethyl-4,5-difluoro-1,3-dioxole, polyvinyltrimethylsilane, polyimide, polyamide, polyaramide, ethyl cellulose and mixtures thereof.

The invention is advantageous to carrying out the purifying step by distillation.

In another embodiment the invention is a process for the separation and recovery of fluorochemicals from a gas stream containing a diluent gas and fluorochemicals by contact of the gas stream with a membrane, comprising the steps of:

(a) compressing a gas stream containing a diluent gas and fluorochemicals to an elevated pressure;

(b) passing said compressed gas stream containing a diluent gas and fluorochemicals through an adsorption system containing one or more stages containing an adsorbent of the type to adsorb said fluorochemicals leaving a purified vent stream rich in said diluent gas;

(c) desorbing said fluorochemicals from said adsorbent to produce a fluorochemical rich stream;

(d) compressing said fluorochemical rich stream;

(e) purifying said compressed fluorochemical rich stream by distillation to produce a fluorochemical product stream and a diluent rich recycle stream; and (f) recycling said vent stream and said diluent rich recycle stream to the vacuum pump as the diluent gas which is combined with the gas stream containing diluent gas and fluorochemicals, the combined stream, after scrubbing being the stream supplied to step (a) to be compressed to an elevated pressure.

The process of this embodiment of the invention includes an optional step wherein the gas stream containing a diluent gas and fluorochemical is initially scrubbed to remove particulates and water soluble components of the gas stream.

The process of the invention is preferably applied to a gas stream containing diluent gas and fluorochemicals selected from the group consisting of $NF_3$, $SF_6$, $CF_2$, $CHF_3$, $C_2F_6$, $C_2HF_5$, $C_3F_8$ and mixture thereof.

The process of the invention is advantageously applied to a gas stream containing a diluent gas and fluorochemicals which is an effluent gas stream from a semiconductor fabrication process.

Preferably the process of the invention uses an adsorption system which is one of pressure-swing, vacuum-swing or temperature-swing.

In yet another embodiment the invention is a process for the separation and recovery of fluorochemicals from a gas stream containing a diluent gas and fluorochemicals by contact of the gas stream with a membrane, comprising the steps of:

(a) compressing a gas stream containing a diluent gas and fluorochemicals to an elevated pressure;

(b) liquifying said compressed gas stream containing a diluent gas and fluorochemicals by heat exchange in a cryogenic distillation unit;

(c) separating a diluent rich stream from a product stream rich in fluorochemicals by cryogenic distillation;

(d) withdrawing said diluent rich stream from said distillation step and recycling said diluent rich stream to the vacuum pump as the diluent gas which is combined with the gas stream containing diluent gas and fluorochemicals, the combined stream, after scrubbing being the stream supplied to step (a) to be compressed to an elated pressure; and (e) withdrawing said stream rich in fluorochemicals from said distillation step as a product stream.

The process of this embodiment of the invention includes an optional step wherein the gas stream containing a diluent gas and fluorochemicals is initially scrubbed to remove particulates and water soluble components of the gas stream.

The process of the invention is preferably applied to a gas stream containing a diluent gas and fluorochemicals selected from the group consisting of $NF_3$, $SF_6$, $CF_4$, $CHF_3$, $CH_3F$, $C_2F_6$, $C_2HF_5$, $C_3F_8$, $C_4F_8$ and mixtures thereof.

The process of the invention is advantageously applied to a gas stream containing a diluent gas and fluorochemicals which is an effluent gas stream from a semiconductor fabrication process.

DETAILED DESCRIPTION OF THE INVENTION

Figure 1:
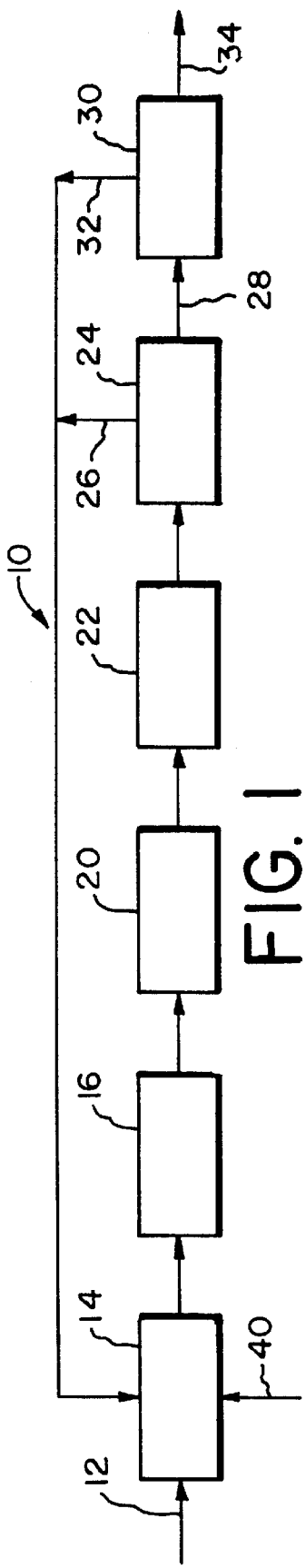
FIG. 1 is a schematic illustration of a first embodiment of the present invention.

The present invention relates to processes to recover fluorochemicals, such as $NF_3$, $SF_6$, $CF_4$, $CHF_3$, $CH_3F$, $C_2F_6$, $C_2HF_5$, $C_3F_8$, $C_4F_8$ and mixtures thereof from the exhausts of semiconductor fabrication facilities. These types of gases are used for etching and cleaning operations in the fabrication of various electronic devices from electronic materials, including the construction of integrated circuits. These gases typically have low utilization in any given process cycle; therefore, the effluent from the processes will contribute to the environmental concern of global warming. In addition, these gases have considerable value if they can be concentrated, purified and recycled for additional utilization.

The present invention, in one embodiment, achieves the capture, recovery and purification for potential recycle of the fluorochemicals described above, wherein the exhaust stream from a semiconductor fabrication facility which is typically rich in vacuum pump diluent, such as nitrogen or other inert gas, is sent, after compression and scrubbing, to a heating zone to elevate the temperature of the gas stream containing a diluent gas and fluorochemicals before being introduced into a membrane system containing one or more stages where the membrane(s) are more permeable to the diluent gas than the fluorochemicals in the gas stream so as to separate the diluent gas from the fluorochemical gas components. This produces a permeate stream rich in vacuum pump diluent and a retentate which is rich in the fluorochemicals.

The retentate, comprising an enriched stream of fluorochemicals is sent to a purification station while the permeate stream, rich in diluent gas is recycled to the vacuum pump.

All membrane stages are operated at elevated temperature to increase the flux of diluent gas through the membrane, while increasing the selectivity between the diluent gases and the fluorochemical gas components.

Depending upon the makeup of the feed gas stream containing diluent gas and fluorochemicals, (n) stages of cascade connected membranes may be utilized, wherein the fluorochemical desired for recovery is concentrated by the membrane and the diluent gas permeates through at a high rate of flux and with greater selectivity at elevated temperature for recycle to the vacuum pump.

The final retentate from the membrane separation, wherein the fluorochemicals are concentrated, is then further processed for higher purification in a typical distillation or adsorptive separation system prior to being used as a recycled product for reutilization by the semiconductor fabrication industry or particularly the particular process from which the fluorochemicals were taken as an effluent stream.

The membrane material may be comprised of polysulfone, polyetherimide, polypropylene, cellulose acetate, polymethylpentane, amorphous copolymers based on 2,2-bistrifluoromethyl-4,5-difluoro-1,3-dioxole, polyvinyltrimethylsilane, polyimide, polyamide, polyaramide or ethyl cellulose polymer, all of which can be configured in hollow fiber, spiral wound or flat sheet geometries.

In the present invention, it has been unexpectedly ascertained that in conducting the membrane separation of fluorochemicals from diluent gases, such as nitrogen and helium, the operation of the membrane at elevated temperature has the surprising effect of not only increasing the flux rate or the permeance of the diluent gas through the membrane, but also increasing the selectivity between the diluent gas, such as nitrogen, and the fluorochemicals. Traditionally, elevated temperatures increase flux rates of the designed permeating stream, but at the risk of reducing selectivity, whereby the designed retentate species also copermeates at an increased permeance or flux rate.

The unique circumstance of increasing the temperature at which the membrane operates, such as by heating the feed gas stream to the membrane, when separating the gas mixtures typically found in semiconductor fabrication clean or etching effluents containing fluorochemicals, results in increased flux or permeance rates for the diluent gas, such as nitrogen while also unexpectedly increasing the selectivity between the diluent gas and the retentate or fluorochemicals, such as the fluorochemicals and perfluorochemicals mentioned above. This unexpected finding provides enhanced operational performance of the present invention, whereby increased throughput can be provided at the cost of heat energy while providing even greater selectivity and, therefore, downstream purity of the fluorochemicals captured and isolated for recovery and potential reutilization.

The present invention contemplates using a plurality of series cascade-connected membranes, wherein the retentate from each membrane constitutes the feed to the ensuing membrane. The permeate stream comprising diluent gas and a small fraction of fluorochemicals would typically be recycled to the vacuum pump to capture fluorochemicals desired for concentration, recertification and reutilization in the process of the present invention.

Elevated pressure contemplated for the separation of the present invention typically would be a pressure greater than 70 psig and more preferably pressures of 100–200 psig. The temperatures to which the process may be subjected to achieve the enhanced performance characteristics of increased permeate flux and increased selectivity between the permeate and the retentate would be temperatures above ambient, typically 100–200° F. and preferably approximately 150° F.

A process according to a first embodiment of the present invention will now be set forth in greater detail with reference to FIG. 1 wherein the process is generally designated as 10. In FIG. 1, a fluorochemical containing exhaust gas from a semiconductor fabrication facility conducting an etch or clean process step is provided in stream 12 comprising a diluent gas, such as nitrogen, and fluorochemicals comprising potentially $NF_3$, $SF_6$, $CF_4$, $CHF_3$, $CH_3F$, $C_2F_6$, $C_2HF_5$, $C_3F_8$, $C_4F_8$, HF, $F_2$ these gases. Additional components in this mixture include; CO, $CO_2$, $H_2O$, $O_2$, $CH_4$, $SiF_4$, $SiH_4$, $COF_2$, $N_2O$, $NH_3$, $O_3$, Ar, $Br_2$, BrCl, $CCl_4$, $Cl_2$, $H_2$, HBr, HCl, He and $SiCl_4$. This gas mixture is typically removed via a vacuum pump 14 from the semiconductor fabrication facility. The gas stream potentially contains particulates which can be filtered out. Other components which are amenable to wet and dry scrubbing are removed in station 16, which typically removes soluble fluorides such as fluorine, hydrogen fluoride and carbonyl fluoride. The wet scrubbing would typically be an aqueous scrubbing solution which removes the soluble fluorides.

The scrubbed gas stream is sent to compressor 20 to be compressed to a pressure greater than 70 psig, and preferably in range of 100–200 psig. The gas stream at elevated pressure is then further heated in indirect heat exchanger 22 against any elevated temperature process stream, such as a process stream for the semiconductor manufacturing facility or a heater or export steam from any given process. The gas stream containing diluent gas and fluorochemicals is heated to a temperature above ambient, typically below 200° F. or any temperature below the decomposition of the membrane stages yet to be contacted and preferably 100–200° F., most preferably approximately 150° F.

The feed gas stream then contacts a semi-permeable membrane system 24 wherein the diluent gas, such as nitrogen, and a certain amount of fluorochemicals in low quantities or low concentrations permeate with increased selectivity between the two due to the elevated temperature to become a permeate stream in line 26 which is recycled to the vacuum pump 14 for reintroduction into the membrane system 24.

The retentate or stream which does not permeate the semi-permeable membrane system 24 is removed as stream 28 with an enriched content of the fluorochemicals. The stream enriched in fluorochemicals 28 is then sent to a purification unit 30 which may be an adsorption system of the pressure-swing, vacuum-swing or temperature-swing type utilizing carbon, polymeric, zeolitic adsorbents and have one or more stages. The purified diluent from the purification unit in line 32 can be combined with the permeate stream from the first stage of the membrane system 24 in line 26 and recycled to the vacuum pump 14 for reintroduction into the membrane system. Alternatively a portion of the diluent stream 32 may be used as a purge for desorption of the fluorochemicals from the adsorptive bed in the purification unit 30 with the other portion being recycled to the vacuum pump. The purge stream from the adsorption unit 30 is considered to be a product stream enriched in fluorochemical content and can be combined with the desorption stream as product stream 34. If necessary, the product stream 34 can be further purified. In this case, any diluent rich streams produced by further purification can also be recycled to the vacuum pump. Make-up vacuum pump diluent in line 40 can be delivered to the vacuum pump on an as needed basis.

Product as stream 34 may be recycled back to the semiconductor process. It is also within the scope of the present invention to take the product stream 34 and send it to a purification station (not shown) which can be operated to produce a fluorochemical product which typically could comprise 99.9% hexafluoroethane and a by-product stream which could contain other fluorochemical gases, such as carbon tetrafluoride.

Various purification processes can be contemplated, but a preferred process would be a distillation process utilizing liquid nitrogen cryogenic fluid to operate the overhead condenser of a distillation column to provide reflux to the column, while heating by any traditional means could provide reboil to a column, wherein the column is operated initially to purify carbon tetrafluoride from inert gases, such as nitrogen, and subsequently the column is operated to remove hexafluoroethane from the sump of the distillation column to provide high purity gaseous hexafluoroethane product for repackaging and recycle.

It is possible to configure the process to produce carbon tetrafluoride, carbon hexafluoroethane, trifluoromethane, octafluoropropane, octafluorobutane, nitrogen trifluoride or sulfur hexafluoride, which are all widely used gases comprising fluorochemicals in etch and clean processes of the semiconductor fabrication industry. An important aspect of the first embodiment of the present invention is the use of elevated temperatures in a membrane separation to separate inert diluent gases from fluorochemicals. Typically, elevated temperatures increase flux at the loss of selectivity. However, in the present invention, it has been found that not only does the flux of the permeate stream increase, but the selectivity between the diluent gas and the fluorochemical is increased given the elevated temperatures of the present invention and the membranes amenable to separating diluent inert gases, such as nitrogen, from fluorochemicals, such as hexafluoroethane. A preferred membrane system is such as described in our copending application Ser. No. 08/741,843 filed Oct. 13, 1996, the specification of which is incorporated herein by reference.

In the process of FIG. 1 additional diluent can be introduced to the vacuum pump 14 via line 40.

Figure 2:
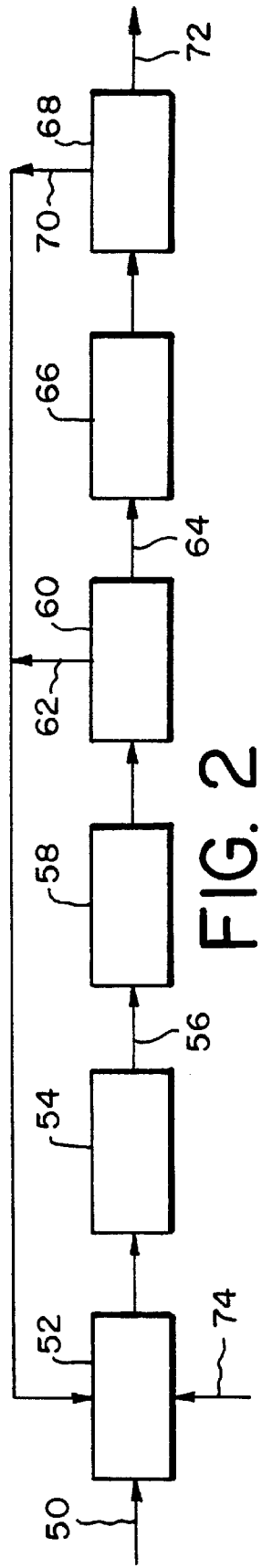
FIG. 2 is a schematic illustration of a second embodiment of the present invention.

A second method according to the invention is illustrated in FIG. 2, wherein a fluorochemical containing exhaust gas from a semiconductor fabrication facility conducting an etch or clean process step is provided in stream 50, stream 50 comprising the same materials described in relation to stream 12 above. The gas mixture in stream 50 is typically removed via a vacuum pump 52 from the semiconductor fabrication facility. As with stream 12 described above, gas stream 50 potentially contains particulates which can be filtered out. Other components which are amenable to wet and dry scrubbing are removed in a scrubbing station 54.

The scrubbed gas stream in line 56 is sent to a compressor 58 to be compressed to a pressure greater than 30 psia and preferably in a range of 45 to 735 psia. The pressurized gas stream is then sent to an adsorption system 60 which can be of the pressure-swing, vacuum-swing or temperature-swing type employing carbon, polymeric, or zeolitic adsorbents comprised of one or more stages. The purified diluent recovered from the adsorption system in line 62 can be recycled to the vacuum pump 52 for reintroduction into the process and into the adsorption system. Alternatively a portion of the diluent in line 62 can be used to purge the stream 64 enriched in fluorochemicals from the adsorption system 60. The enriched stream 64 is then compressed in compressor 66 to a pressure greater than 14.7 psia and the pressurized stream sent to a distillation station 68 where an enriched diluent stream 70 and a fluorochemical product stream 72 are recovered. The diluent rich stream 70 can be combined with the diluent stream 62 and returned to the vacuum pump for reintroduction into the process. Make-up diluent can be introduced through line 74 on an as needed basis.

Figure 3:
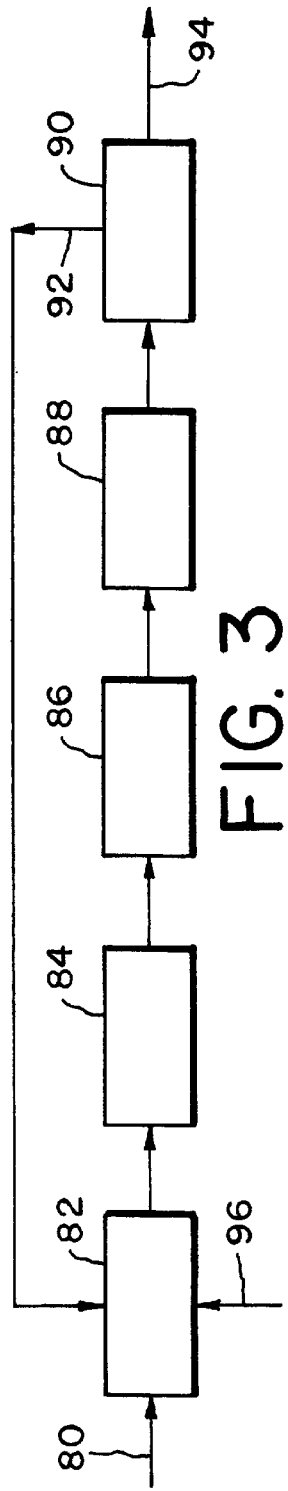
FIG. 3 is a schematic illustration of a third embodiment of the present invention.

FIG. 3 illustrates a third embodiment according to the present invention wherein the fluorochemical containing exhaust gas from the semiconductor fabrication facility, as described above, is provided in stream 80. As before the stream 80 is typically removed from the semiconductor fabrication facility via a vacuum pump 82. Stream 80 can be subject to particulate removal, and then wet and dry scrubbing in scrubber 84. Thereafter the stream is compressed in a compressor 86 to a pressure of greater than 14.7 psia preferably, between 22 and 88 psia and thereafter sent to a heat exchanger 88 wherein the temperature of the stream is reduced less than −50° F. preferably in the range of between −100° F. and −180° F. The cooled stream is then sent to a distillation unit 90 where a diluent rich recycle stream 92 and a fluorochemical enriched product stream 94 are produced. As with the previous processes the diluent rich stream from the distillation unit can be recycled to the vacuum pump. Provision is made by a conduit 96 to introduce make-up vacuum pump diluent on an as needed basis.

Thus according to the present invention processes are disclosed which permit recovery of perfluorinated compounds (PFC's) such as $NF_3$, $CHF_3$, $CF_4$, $C_2F_6$, and $SF_6$ from the exhaust of semiconductor fabrication facilities while recycling the vacuum pump diluent back to the vacuum pump. After scrubbing of the toxic gases from the exhaust stream and compression of the resulting stream the stream can undergo one of the following separation and/or purification processes. These are: (1) passing the stream through a membrane system consisting of one or more stages at ambient or elevated temperature with a permeate from the membrane system recycled back to the vacuum pump while the retentate stream containing fluorochemicals (PFC's) can be purified by a further purification step consisting of distillation or adsorption, with the diluent rich stream from any subsequent purification unit recycled back to the vacuum pump; (2) passing the stream through an adsorption system consisting of one or more stages and splitting the purified diluent gas into a purge for desorption of the fluorochemicals (PFC's) from the adsorption beds and a recycle stream for return to the diluent pump, with the fluorochemicals in the purge stream from the adsorption unit being further purified by distillation, with the diluent rich stream from any subsequent purification unit also recycled to the vacuum pump; and (3) passing the stream through a cryogenic distillation unit to produce a diluent rich stream in the distillation column which is recycled back to the vacuum pump and a product stream which is enriched in fluorochemicals.

In all of the above schemes make-up diluent can be added to the vacuum pump as needed. Recycling of the diluent to the vacuum pump reduces the capital cost of the separation unit and the operating cost of the compressor as well as the need for additional diluent.

Processes according to the invention provide for recovery of all of the high value fluorinated chemicals while reducing emission of global warming gases.

The present invention has been set forth with regard to several preferred embodiments, but the full scope of the invention should be ascertained by the claims which follow.

What is claimed:

1. A process for the separation and recovery of fluorochemicals from a gas stream containing a diluent gas and fluorochemicals by contact of the gas stream with a membrane, comprising the steps of:
    (a) compressing a gas stream comprising a diluent gas and fluorochemicals to an elevated pressure;
    (b) heating the gas stream containing a diluent gas and fluorochemicals to an elevated temperature sufficient to increase the flux of the permeate stream of step (c) and to increase the selectivity of the membrane of step (c) for the permeation of the diluent gas of step (c) relative to the permeation of the fluorochemicals of step (c);
    (c) contacting the gas stream with a membrane system containing one or more stages to produce a permeate stream rich in the diluent gas and a retentate rich in fluorochemicals;
    (d) purifying the retentate by a process selected from the group consisting of distillation and adsorption to produce a product stream richer in fluorochemical and a recycle stream rich in diluent gas
    (e) recycling the permeate stream and the recycle stream for use as the diluent gas which is combined with the gas stream containing diluent gas and fluorochemicals, the combined stream, after scrubbing, being the stream supplied to step (a) to be compressed to an elevated pressure.

2. The process of claim 1 wherein the gas stream containing a diluent gas and fluorochemicals is initially scrubbed to remove particulates, acid gases, and other water soluble components of the gas stream.

3. The process of claim 1 wherein the gas stream containing a diluent gas and fluorochemicals contains fluorochemicals selected from the group consisting of $NF_3$, $SF_6$, $CF_4$, $CHF_3$, $CH_3F$, $C_2F_6$, $C_2HF_5$, $C_3F_8$, $C_4F_8$ and a mixture thereof.

4. The process of claim 1 wherein the gas stream containing a diluent gas and fluorochemicals is an effluent gas stream from a semiconductor fabrication process.

5. The process of claim 1 wherein the membranes are selected from the group consisting of polysulfone, polyetherimide, polypropylene, cellulose acetate, polymethylpentane, amorphous copolymers based on 2,2-bistrifluoromethyl-4,5-difluoro-1,3-dioxole, polyvinyltrimethylsilane, polyimide, polyamide, polyaramide, ethyl cellulose and mixtures thereof.

6. The process of claim 1 wherein the purifying step is carried out by distillation.

7. The process of claim 1 wherein the product stream comprises $C_2F_6$.

* * * * *